United States Patent

Grisell

[15] 3,641,725
[45] Feb. 15, 1972

[54] METHOD OF PACKAGING
[72] Inventor: Richard T. Grisell, Terre Haute, Ind.
[73] Assignee: Polypac, Inc., Terre Haute, Ind.
[22] Filed: Jan. 16, 1970
[21] Appl. No.: 3,546

Related U.S. Application Data

[63] Continuation-in-part of Ser. No. 847,921, Aug. 6, 1969, abandoned.

[52] U.S. Cl. .................................. 53/14, 53/27, 53/36, 206/46 FC, 264/45
[51] Int. Cl. ............... B29d 27/00, B65d 81/12, B65d 85/68
[58] Field of Search .............. 53/27, 36, 170, 14; 206/46 FC; 264/41, 45

[56] References Cited

UNITED STATES PATENTS 3,204,385  9/1965  De Remer et al. ....................... 53/27
3,394,797  7/1968  Flannigan ............................ 53/46 FC Primary Examiner—Theron E. Condon
Assistant Examiner—Neil Abrams
Attorney—Robert H. Dewey

[57] ABSTRACT

A method of packaging steel and other articles wherein the articles to be packaged are first enclosed in a flexible sheet of material such as polyethylene and are then encapsulated in a cellular plastic sheath in a mold by placing a liquid foamable reaction mixture in the mold under confinement and at resulting conditions of elevated temperature and pressure. The flexible sheet enclosure is vented to atmosphere through the mold wall so that, as the foamable reaction mixture expands in the mold, there is no blockage by bubbles of air inside the flexible sheet enclosure.

14 Claims, 13 Drawing Figures

PATENTED FEB 15 1972

INVENTOR.
RICHARD T. GRISELL
BY
Woodard, Weikart, Emhardt, & Naughton
ATTORNEYS

INVENTOR.
RICHARD T. GRISELL
BY
Woodard, Weikart, Emhardt, & Naughton
ATTORNEYS

METHOD OF PACKAGING

CROSS-REFERENCE TO RELATED APPLICATIONS

This application is a continuation-in-part of copending application, U.S. Ser. No. 847,921 filed Aug. 6, 1969, now abandoned.

BACKGROUND OF THE INVENTION

1. Field of the Invention

This invention relates to a method of packaging. In a particular aspect, this invention relates to an improved method of packaging in a foamed cellular plastic to protect the contents of the package.

2. Description of the Prior Art

Various procedures are known in the art for encapsulation packaging such as for example as disclosed in the U.S. Pat. Nos. to Freeman 2,895,603; Sterling 2,653,139; Chavannes et al., 2,524,162; Kishibay 2,516,124; Simon et al., 2,897,641; Schulz 2,985,287; Simon et al., 2,780,350 and to Schneider 3,222,843. These prior art procedures are not always entirely satisfactory in all respects and may be subject to one or more of the following deficiencies: first, rupture of the package or damage to the contents of the package upon rough handling; second, breaking through of the contents of the package to damage other packages and articles being shipped; third, incomplete enclosure of the articles being packaged; and fourth, adhering of the packaging material to the articles being packaged.

In general the first two of these disadvantages have resulted from lack of strength of the foamed plastic even though the package was placed in an outer carton or box to further protect it. The third disadvantage generally derives from an unsystematic procedure employed in injecting the foamable plastic used for the encapsulation. Furthermore these prior procedures have been generally applied to relatively small, easily handled articles. Accordingly a need has long existed for a method of encapsulating articles in a cellular foamed plastic having sufficient strength to protect the encapsulated article without the necessity of an exterior carton or box, and a procedure suitable for encapsulating even very large articles without the occurrence of voids.

SUMMARY OF THE INVENTION

The present invention is an improved method of packaging articles in a rigid cellular plastic sheath by wrapping an article in a flexible sheet thereby forming an enclosure; sealing the sheet; placing the wrapped article in a mold; providing tear strips for opening the package, and encapsulating the article in a foamable, plastic-forming reaction mixture. The improvement of the present invention includes the steps of (a) placing a tubular vent, or plurality thereof, in the mold with one end extending and terminating outside the mold and the other end extending and terminating within the enclosure formed by the sealed sheet, and sealing the tube therein, (b) using a pressure-resistant mold, generally but not necessarily, having two sides, two ends, a top and a bottom and having a plurality of air escape vents along the top of the mold, a plurality of closeable ports and a means suitable for extending said tubular vent, or plurality thereof, and securely closing the mold, (c) introducing a foamable, plastic-forming reaction mixture into said mold through each of said ports, incrementally and sequentially, closing each port after introducing said mixture therethrough, and expanding said mixture under confinement in said mold, whereby elevated pressures and temperatures are obtained thereby, to cause said sheet to tightly surround said article and to cause air within said sheet to be forced out of said tubular vent and causing air in the mold to be forced out of the air escape vents; and causing said reaction mixture to form a solid, rigid cellular plastic sheath that surrounds said article to form an encapsulated article, (d) removing the encapsulated article from the mold, and (e) removing the tubular vent, or plurality thereof, thereby forming an opening, or plurality thereof, in the sheath, and plugging the opening, or plurality thereof, thereby providing the packaged article.

The resulting foamed cellular plastic sheath exhibits a gradient structure characterized by, in cross section, a tough, outer hide, followed by a region of high density adjacent thereto gradually decreasing in density to a region of lower density adjacent thereto in the center of the plastic, then a region of high density adjacent thereto and a tough inner hide adjacent to the flexible sheet wherein the article is encapsulated. There is also provided a reinforcing means and an encapsulating procedure which insures the elimination of voids. The method also provides for a rip strip for opening the package.

Articles packaged in the foregoing manner are protected from damage due to rough handling, especially when the reinforcing means, as described hereinafter, is employed. The method advantageously is employed for articles weighing several tons. Such articles can be handled by truck fork lifts, yard buggy, or crane with any type of sling or most lifts. When encapsulated within sufficient cellular plastic to insure buoyancy, the article, particularly a large one, can even be unloaded into the open sea, where it floats. It can then be equipped with an outboard motor, and directed to shore without the necessity of an auxiliary unloading vessel or pier facilities. This advantage is obviously of great value for areas having access to lakes and open sea but which are deficient as to harbor and port facilities.

Objects of the invention are to provide an improved packaging method, to provide a method of packaging which protects the contents of the package as well as other goods surrounding the package during shipment, and to provide a method of packaging which prevents the enclosing material from adhering to the goods being packaged yet which permits a sturdy uninterrupted enclosure around the packaged articles.

Still another object is to provide a method of packaging an article in a strong, foamed cellular plastic which requires no additional outside packaging. Still yet another object is a method of packaging articles varying from small to very large without the occurrence of voids.

Other objects of this invention will be readily apparent to those skilled in the art from the disclosure herein.

DESCRIPTION OF THE PREFERRED EMBODIMENTS

Figure 1:
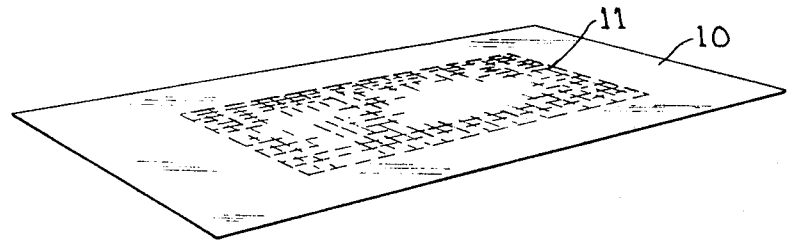
FIGS. 1, 2 and 3 are perspective views showing initial steps in the process.

Referring now more particularly to the drawings, there is illustrated in FIG. 1 an initial step in the process of packaging. The present procedure can be used to encapsulate a product which is fragile or nonfragile, large or small, or light or heavy. Assuming, for example, that the procedure is used to package steel used in building construction, a package might be created which is for example on the order of 10×3×2 feet. In FIG. 1 there is illustrated a sheet of polyethylene 10 resting upon a sheet of reinforcing mesh 11. The strength of the reinforcing mesh 11 is determined by the material being packaged. In some applications cardboard or light gauge steel might replace the mesh. Preferably, however, mesh greater than about ⅜×⅜ inch is employed and the preferred mesh is that known as burial vault mesh having apertures about ¾×1 inch. The fencing material known as chicken wire is also suitable mesh. An example of unsuitable mesh is one having apertures less than ⅜×⅜ inch. It is not necessary that the apertures be rectangular nor that they have any particular shape. In the present example the wire mesh used is ¾×¾ inch heavy gauge.

Figure 2:
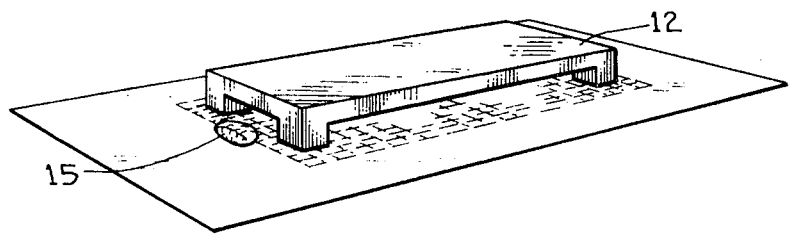
Figure 3:
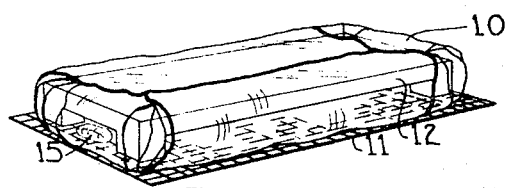
Figure 4:
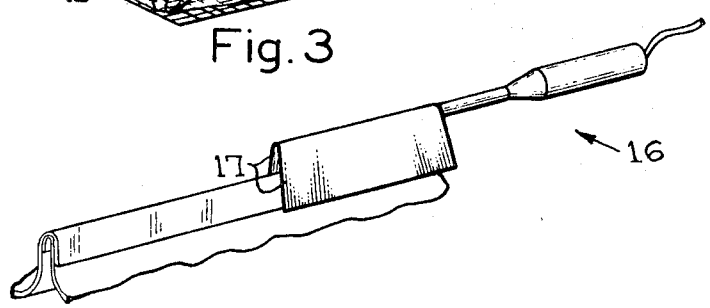
FIG. 4 is a perspective view of certain detail portions of the workpiece showing a further step in the process.

Referring to FIG. 2, the products, article or materials to be packaged 12 are placed upon the mesh 11 and the sheet 10 along with a desiccant 15. When desired, the article is spaced from the mesh by one or more suitable blocks placed between the polyethylene and the mesh to insure an adequate thickness of plastic beneath the article and to insure that the mesh will be about equidistant therein in the finished package. The product is then wrapped as shown in FIG. 3 by surrounding the product 12 with the polyethylene and sealing it. Sealing can be effected by use of adhesive-coated tape or by heat sealing. The heat sealing procedure is illustrated in FIG. 4 and can be accomplished by a commercially available tool 16 which includes a pair of jaws 17 which are hinged together and can be closed against the polyethylene to seal it together. The jaws 17 may be coated for example, with an easy release material such as Teflon which makes possible the fusing of the polyethylene but which permits easy release of the tool 16 from the fused together polyethylene. It should be understood that in packaging, for example, a plurality of pieces of steel for use in a prefabricated building, the longest and heaviest items making up the product, usually but not necessarily, should be placed on the polyethylene first and the balance of the items stacked on top. The use of the desiccant 15 is for the purpose of preventing rusting of the materials and in some applications is not needed.

Figure 5:
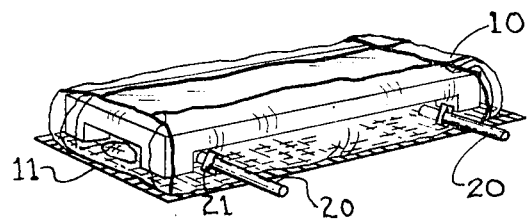
FIG. 5 is a further perspective view showing another step in the process.

Referring now to FIG. 5, the next step in the process is the inserting of a pair of tubes or hoses 20 (of at least 1 inch diameter in the present example) through the polyethylene 10, to provide for escape of air. The diameter of the tubes may vary considerably, i.e., from about ⅜ to about 10 inches, depending on the size of the article being packaged. For a small article the tube may conveniently be about ⅜ inch inside diameter. For a very large package the hose may be as large as 10 inches in diameter. The tubes are sealed in place by suitable tape 21 thus providing venting of the interior of the package to the atmosphere.

Figure 6:
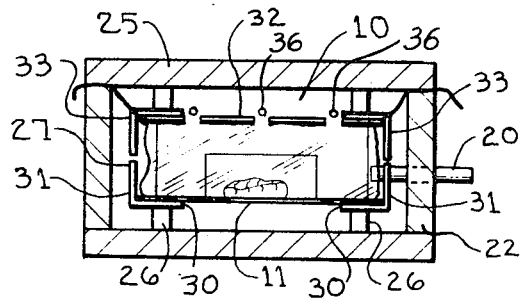
FIG. 6 is a sectional view taken through the mold used in the process showing still another step of the process.

The article is now placed in the mold, constructed as hereinafter set forth, which is lined with a suitable mold release agent, e.g., Pedapar paper, polyethylene, or other suitable agent many of which are known. As shown in FIG. 6, the placing of the tubes 20 through the polyethylene 10 is accomplished in such a manner that he tubes 20 are projected through the sidewall 22 of the mold 25. The package enclosed in the polyethylene 10 with the mesh 11 therebeneath is placed in the mold 25 on blocks 26 which may be, for example, 2 inches square and formed of any suitable material such as wood, metal, glass, or polyurethane. It should be understood of course, that the wire mesh 11 can be placed in the mold initially and the various steps illustrated in FIG. 1–5 can be performed in the mold 25 with the sides and top open or just the top open. When the package is placed in the mold, it also rests upon reinforcing wire mesh 27 (of the same type as the mesh 11) as hereinbefore set forth, which is folded at a 90° angle as illustrated so that the lower leg 30 of each section of wire mesh is beneath the product while the upright leg 31 of each section is alongside the product but positioned approximately equidistant between the wall of the mold and the wrapped article. The reinforcing wire mesh 27 is similarly placed at the opposite ends of the package as well as on the longitudinally extending sides of the package in most embodiments of the invention. When so located the same 90° L-shaped relationship is used, and the upright leg is placed about equidistant between the wall of the mold and the article. In experimental studies it was determined that sever damage inflicted on the package caused at least partial destruction as far as the mesh, but that surprisingly no damage was transmitted beyond the mesh into the interior of the package. The damage-causing force was such that it could not have been withstood by either the mesh along or by the plastic alone.

Figure 7:
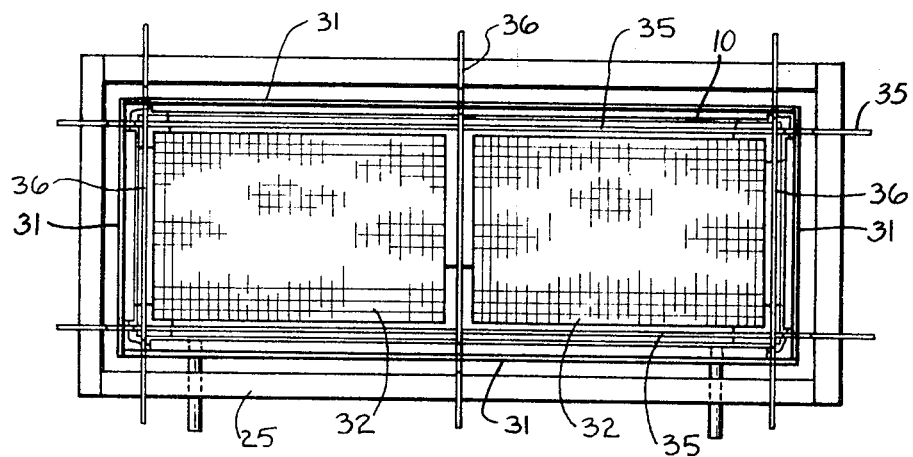
FIG. 7 is an enlarged top plan view of the mold with the workpiece therein showing still another step of the process.

Also shown in FIG. 6 are mesh sections 33 of reinforcing wire mesh also arranged at 90° angle and nested over the junctions of the sides and top of the polyethylene enclosed product so that the upright leg is about equidistant between the side of the mold and the wrapped article. Sections 33, which are counterparts of mesh 27, are preferably employed with very large articles and may be omitted when smaller articles are packaged, as desired. It has been found that the top sections 33 are necessary to the package when a crane is used to move the package by means of cable, chain, rope, etc. The sections 33 protect the contents of the package even though the cable tends to cut into the package. FIGS. 6 and 7 also show 2 sheets 32 of wire mesh resting on top of the polyethylene enclosed product. The sheets 32 are spaced from top sections 33 to provide for tear strips for opening the package. They prevent the package from puncturing when an item is dropped on the package or rupturing when it is lifted with a crane, fork lift truck or any type of lifting device. It is important that neither the sheets 32 nor sections 33 cover the tear strips. Both the sheets 32 and the angle sections 33 should be taped to the polyethylene with sufficient slack that when the foamable mixture is introduced, the mesh is maintained approximately equidistant from the top of the wrapped article and the top of the mold. Otherwise the mesh will be horizontally displaced and will float over the tear strips described hereinafter.

Figures 11, 12:
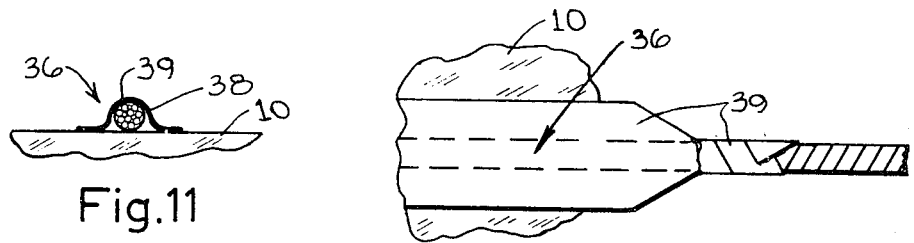
FIG. 11 is a fragmentary detail section of a tear strip forming a part of the package.
FIG. 12 is a fragmentary detail plan view of the structure of FIG. 11.

Referring now to FIG. 7, the top view of the mold, before the lid has been put in place, shows that sheets 32 of wire mesh are preferably but not necessarily (except for large packages) placed on top of the package inside of and between, but not covering, tear strips 35 and 36 which extend longitudinally and transversely of the package. The tear strips 35 and 36 are provided by a flexible filament or line, e.g., a piece of wire, rope or cable 38 which is secured to the polyethylene 10 by high tensile strength adhesive tape 38 and 39 in the manner illustrated in FIGS. 11 and 12. A preferred high tensile strength adhesive tape for most packages is filament tape manufactured by Minnesota Mining and Mfg. Co. The flexible filaments (or tear strips) 35 and 36 are arranged to extent outside of the mold 25 as shown in FIG. 7. As shown in FIG. 12 tape 39 is wrapped around the portion of line 36 which extends from the mold. The purpose of the tear strips 35 and 36 is for use in opening the package after it has reached its destination. The tear strip not only tears through the cellular plastic sheath, but the adhesive tape also tears the polyethylene 10 which otherwise is exceedingly difficult to open after the encapsulating process.

Figure 8:
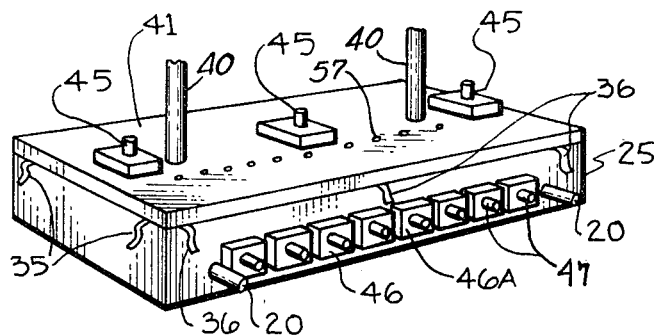
FIG. 8 is a perspective view of the mold showing a further step in the process.

It should be noted that except for blocks 26 and other possible spacers holding legs 31 in place, at least two inches of void is now present between all planes of the polyethylene and the walls of the mold or fixture. When severe handling is anticipated, or buoyancy is desired, the void may be increased as desired, e.g., to 10, 18 or 24 inches or more. The mold is closed securely as suggested in FIG. 8 for example by means of motor operated vertically movable connecting members 40 which are operable to raise and lower the upper member 41 forming the top closure member of the mold. The mold 25 should be of a construction capable of withstanding approximately 150 pounds per square foot gauge pressure. Wood is a suitable material of construction but metal, e.g., steel or aluminum, is preferred for assembly-line type of packaging. A row of plurality of apertures 57 is provided along the length of the top, generally at the axis, or approximately so; the apertures are of a size to admit an ordinary darning needle, e.g., apertures of about one-sixteenth inch diameter or less. After the mold release agent is installed in the top, a pricking means, e.g., a needle or small drill, etc., is passed through each hole to provide a plurality of punctures in the mold release paper, thus allowing the exit of air during the injection step. These apertures are subsequently sealed by the foam. It will be noted in FIG. 8 that the tear strips 35 and 36 project from the mold, and a means is provided suitable for extending the tubular vent, or plurality thereof, through the wall of the mold. Also in FIG. 8 it can be seen that there are a number of ports 45 and 46 of about ½–6 inches diameter positioned about 12–24 inches apart, preferably about 18 inches, along the length at the bottom and along the top of the mold. These ports are provided with a closing means (not shown), such as ball valves, gate valves, plug valves or other suitable means, e.g., composition stoppers driven in tightly with a mallet. These valves can be manually, electrically, or pneumatically operated. Each of these ports is provided with a sleeve 47 by which means polyurethane or foamable polymeric material is introduced incrementally into the mold by any suitable means, e.g., a hose, or piping. During the filling step, the hose should be inserted through each sleeve a sufficient distance into the mold to discharge the material near the centerline of the mold. The sequence in which the foamable reaction mixture is introduced through the ports into the mold is critical in order to eliminate voids and create the pressure and temperature required to produce the density gradation which is an important aspect of the present invention. Also, the increments, or amount, introduced into each port is likewise critical for the production of a satisfactory package. The amount is predetermined as follows. The total amount of foamable reaction material used is determined by the required density, i.e., from 1.5 to 20 lbs. per cu. ft. of volume of void in the mold. About 60 percent of the total amount is injected in the bottom of the mold through the ports along the side of the mold and 40 percent through the ports in the top. The rate of pumping of reaction mixture is determined, from which can be readily calculated the length of pumping time required to introduce the total amount of reaction mixture. The time required to introduce each increment in each port is then determined accordingly. The hose or pipe is inserted first in the centermost sleeve 46A at the bottom of the mold and then in sequence toward the end of the package nearest thereto. Then the hose is returned to the next centermost sleeve and introduction of reaction mixture is carried out sequentially as before. Next the hose is moved to the centermost port on the top of the mold, thence to the end, as before; then the hose is returned to the next centermost port, and thence to other end. It is this pattern of introduction which is termed "sequentially and incrementally." After each introduction of reaction mixture is completed in a respective sleeve, the hose is withdrawn and the port is closed.

The foamable reaction mixture is in a fluid state as it moves into the mold and upon entering and reacting in the mold it expands so as to fill all of the void within the mold to produce a rigid foam 48 completely surrounding the polyethylene enclosed product. The temperature thereupon rises as a result of heat of reaction to about 100°–220° F. or higher. The final pressure is created when the mold is filled with foam, the air escape exits are blocked by the polymer, and all ports have been closed. The amount of pressure so generated varies with the amount of foamable polymeric material injected, as set forth above, but it generally varies from about 0.5–30 p.s.i.g., usually from 1 to 5.

The function of the tubes 20 is to vent the inside of the polyethylene so as to prevent blockage of the polymeric material as it expands inside of the mold. Thus the venting of the interior enclosure of product makes possible the placing of a complete coating around the product of approximately a minimum of 2 inches and as much as 12 inches or more of rigid foam polymeric material with all indentations and crevices in the product also having the rigid foam projecting thereinto.

Figure 9:
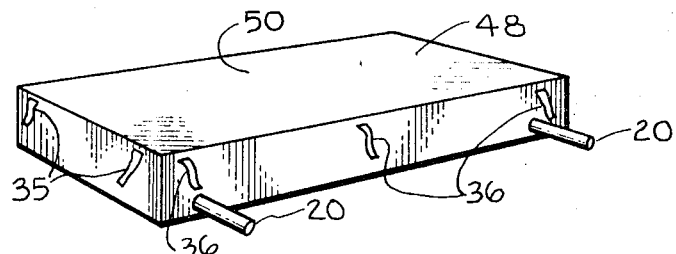
FIG. 9 is a perspective view of the workpiece after it has been removed from the mold and showing still a further step in the process.
Figure 10:
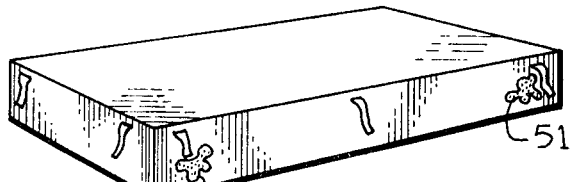
FIG. 10 is a view similar to FIG. 9 showing still another step in the process.

Referring now to FIG. 9, the resulting package 50 is shown after removal from the mold. Projecting from the package are the tear strips 35 and 36 as well as the tubes 20. The next step of the process is the removal, e.g., by cutting off, of the tubes 20 approximately 1 inch inside of the sidewall of the package 50. The final step is the sealing shut of the inside of the package by plugging and filling of the resulting openings produced by the removal of the tubes with a suitable plug, e.g., additional polymeric material 51. Also the tear strips 35 should be cut off flush with the outside surface of the foam 48 to prevent inadvertent opening of the package prior to its reaching its intended destination.

As mentioned the outside layer of the package 50 in the above embodiment comprises a section of rigid foam material about 2 inches or more thick. Generally, this section must have sufficient structural integrity to adequately support the articles received in the package. This structural integrity is achieved by filling the mold under conditions of confinement and elevation of pressure, resulting in the gradient structure described hereinabove. When desired, the outside of the mold can be cooled by any suitable means resulting in a thicker outside hide.

Examples of polymeric materials which are suited for use as the rigid cellular plastic sheath in this invention include both homopolymeric and copolymeric substances, such as poly α-olefins such as polyethylene, polypropylene, polybutylene, polyisoprene and the like; preferably polyurethanes such as are prepared from polyols and organic polyisocyanates; and polystyrene, including polymers of styrene with monomeric compounds such as acrylonitrile and butadiene. These materials are producible from commercially available monomeric materials and the usual grade of commercial material is suitable for the practice of this invention. Also it is often possible to use off-grade materials.

A more preferred group of polymeric materials for use as the foam 48 includes foamed polystyrene and polyurethanes. The polyurethane-producing reaction materials are particularly preferred. Foamable reaction mixtures yielding rigid, cellular plastics are well known in the art and any of these known foamable mixtures are suitable for the practice of this invention. If a particular mixture is not sufficiently exothermic to produce the preferred heating, a heating means for the mold is employed.

A most preferred foamable polymer for use in accordance with this invention is polyurethane produced by mixing 100 parts of a quasiprepolymer of tolylene diisocyanate and the propylene oxide adduct of sorbitol, the quasiprepolymer having a free isocyanate content of about 30 percent; 100 parts of a mixture of the propylene oxide adduct of sucrose in dipropylene glycol, wherein the ratio of the sucrose adduct to dipropylene glycol is 3 to 1; about 45 parts of trichloromonofluoromethane; about one part of a catalyst which is triethylene diamine; and about 1½ parts of an oxyalkylene oxysiloxane block copolymer surfactant to regulate the cell size.

Polymeric materials as used in accordance with this invention contain a blowing agent which can be a gas or a compound which decomposes to produce a gas, as is known to those skilled in the art.

Examples of suitable gases which can be used as glowing agents are trichloromonofluoromethane, carbon dioxide, nitrogen, air, etc.

The process as taught in this invention is adapted to utilize a wide range of blowing agents; for example, blowing agents such as azobisformamide; azobisisobutyronitrile; diazoaminobenzene; N,N-dimethyl-N, N-dinitroso terephthalamide; N,N-dinitrosopentamethylenetetramine, benzenesulfonyl-hydrazide; benzene-1, 3-disulfonyl hydrazide; diphenylsulfon-3-3; disulfonyl hydrazide; 4,4'-oxybis benzene sulfonyl hydrazide, p-toluene sulfonyl semicarbazide; barium azodicarboxylate; butylamine nitrile; nitroureas; trihydrazino triazine; phenylmethylurethane p-sulfonhydrazide; and sodium bicarbonate.

It is to be understood that the above description relative to the polymeric materials and blowing agents is not meant to be limiting.

Figure 13:
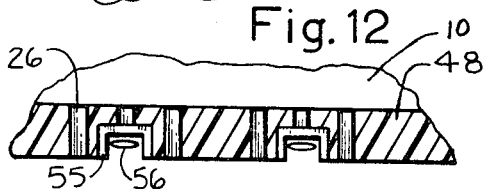
FIG. 13 is a fragmentary view of an alternative form of the package of this invention.

In the case of heavy packages it is desirable to provide a means for removing the package from the mold. Preferably the mold used has one sidewall which folds downwardly to permit ready access for removal of the molded product. Advantageously, removal can be facilitated by wrapping a pair of channels in polyethylene and placing them in the bottom of the mold but in spaced relation to the polyethylene coated product. This spacing is obtained by the use of blocks such as 26. The resultant product is illustrated fragmentarily in FIG. 13 wherein 48 is the foam polyurethane, 55 are the channels, and 56 are the tines of the forklift truck. The channels can be used over and over with the mold and the resultant grooves formed in the package can be used to receive material handling equipment between the source and destination of the package.

As mentioned hereinbefore, the outside of the mold can be cooled by any suitable means resulting in a thicker outer hide. Many such means are known, including use of a water-spray, a partial-immersion-water bath, a water jacket encompassing the mold or an environment of frigid air, and the like. A water-spray is preferred.

The present invention produces a package which is water proof, vapor proof and shock resistant. The packages are also thief proof in the sense that any tampering therewith can be immediately ascertained.

I claim:

1. In a method of packaging articles by wrapping the article in a flexible sheet, sealing the sheet, thereby forming an enclosure placing the wrapped article in a mold, providing tear strips for opening said packaged article, introducing a foamable, plastic-forming reaction mixture into said mold, expanding said mixture in said mold to cause said sheet to tightly surround said article and to cause said reaction mixture to form a solid, rigid, cellular plastic sheath surrounding said article, thereby forming an encapsulated article, the improvement comprising the steps of:
  a. placing a tubular vent or plurality thereof in the mold with one end extending and terminating outside the mold and the other end extending and terminating within the enclosure formed by said sealed sheet, and sealing said other end of said tube within said enclosure.
  b. using a pressure-resistant mold generally having two sides, two ends, a top and a bottom and having a plurality of air escape vents along said top of said mold, a plurality of closeable ports, and a means suitable for extending said tubular vent or plurality thereof,
  c. introducing said reaction mixture through each of said ports incrementally and sequentially, closing each port after introducing said mixture therethrough, and expanding said mixture under confinement whereby elevated pressures and temperatures are obtained, thereby forming said article encapsulated in a sheath,
  d. removing said encapsulated article from said mold,
  e. removing said tubular vent or plurality thereof thereby forming an opening or plurality thereof in said sheath and plugging said opening or plurality thereof, thereby providing said packaged article.

2. The method of claim 1 additionally comprising the step of securing a flexible line or plurality thereof to the said flexible sheet by high tensile strength tape prior to forming the plastic sheath around the said article to provide said tear strip or plurality thereof for removing the sheath and said flexible sheet.

3. The method of claim 1 additionally comprising the step of placing a reinforcing mesh sheet having apertures greater than about ⅜×⅜ inch below said flexible sheet prior to wrapping the article in the flexible sheet, so that said reinforcing mesh sheet is outside of the said flexible sheet when the article is wrapped.

4. The method of claim 3 additionally comprising the steps of (a) placing blocks in said mold to support said wrapped article centrally in said mold when the article is placed in said mold, (b) placing said reinforcing mesh on said blocks and said wrapped article on said mesh, (c) extending the said reinforcing mesh upwardly around said article and spaced about equidistant from the wrapped article and the mold, (d) placing an additional sheet of said reinforcing mesh or a plurality thereof on the top of the said wrapped article and attached thereto by high tensile strength adhesive tape of a length sufficient to maintain said mesh about equidistant from the top of said wrapped article and the top of said mold.

5. The method of claim 3 additionally comprising the step of securing tear strips in a rectangular pattern to the flexible sheet prior to forming the plastic sheath around the article for later removing the sheath, and prior to forming the plastic sheath around the article, the step of placing a rectangular section of reinforcing mesh on top of the wrapped article inside of the said rectangular pattern so located as not to cover said tear strips.

6. The method of claim 4 additionally comprising the step of placing additional blocks between said mesh and said article thereby maintaining said mesh about equidistant between said article and said mold.

7. The method of claim 1 wherein said foamable plastic is a member selected from the group consisting of polyethylene, polystyrene and polyurethanes.

8. The method of claim 1 whereby the pressure resulting from said confinement within said mold is within the range of from about 0.5 to about 30 p.s.i.g. and the temperature resulting from said reaction is in the range of from about 100° to about 220° F. and said plastic sheath has a gradient structure characterized by a tough outer hide, a region of high density adjacent thereto, a region of lower density adjacent thereto, a region of high density adjacent thereto and a tough inner hide adjacent to said flexible sheet.

9. The method of claim 8 wherein said mold is cooled by a cooling means to provide an exterior hide of improved toughness.

10. The method of claim 8 wherein said pressure is within the range of from about 1 to about 5 p.s.i.g.

11. The method of claim 1 wherein a first plurality of closeable ports of said mold are located along the length of and spaced upwardly from the bottom of said mold and a second plurality of closeable ports is located along the top of said mold.

12. The method of claim 11 wherein said first plurality of ports are spaced 12–18 inches apart.

13. The method of claim 11 wherein said reaction mixture is introduced in a predetermined increment through each of said ports in a sequential manner starting at the centermost of said first ports, introducing said predetermined increment of reaction mixture therein and closing said port, and sequentially and incrementally introducing reaction mixture in each sequential port to the end of said mold, closing each port after each incremental introduction, then introducing said reaction mixture in the next centermost of said first plurality and sequentially and incrementally introducing reaction mixture in the remainder of said first plurality of ports and closing each port following each increment, and starting at the centermost port in the top of said mold, introducing reaction mixture sequentially and incrementally through each port to the end of said mold and closing each port after each of said increments, then introducing said reaction mixture the next centermost port and sequentially and incrementally through the remaining ports to the end of said mold, and closing each port after said increment.

14. The method of claim 11 wherein said mold is cooled by a cooling means during the introduction of the reaction mixture.

* * * * *